March 15, 1938.  B. RIDGEWAY  2,110,964

TRANSMISSION

Filed Oct. 1, 1936  6 Sheets-Sheet 1

Inventor:
Bruce Ridgeway.
By
Attorney

March 15, 1938. B. RIDGEWAY 2,110,964
TRANSMISSION
Filed Oct. 1, 1936 6 Sheets-Sheet 2

Inventor:
Bruce Ridgeway.
By Dyrenforth, Lee, Chritton & Wiles
Attorneys.

March 15, 1938.  B. RIDGEWAY  2,110,964
TRANSMISSION
Filed Oct. 1, 1936  6 Sheets-Sheet 3

Inventor:
Bruce Ridgeway
By Dyrenforth, Lee, Chritton & Wiles
Attorneys

March 15, 1938. B. RIDGEWAY 2,110,964

TRANSMISSION

Filed Oct. 1, 1936 6 Sheets-Sheet 4

Inventor:
Bruce Ridgeway
By Dyrenforth, Lee, Chritton & Wiles
Attorneys

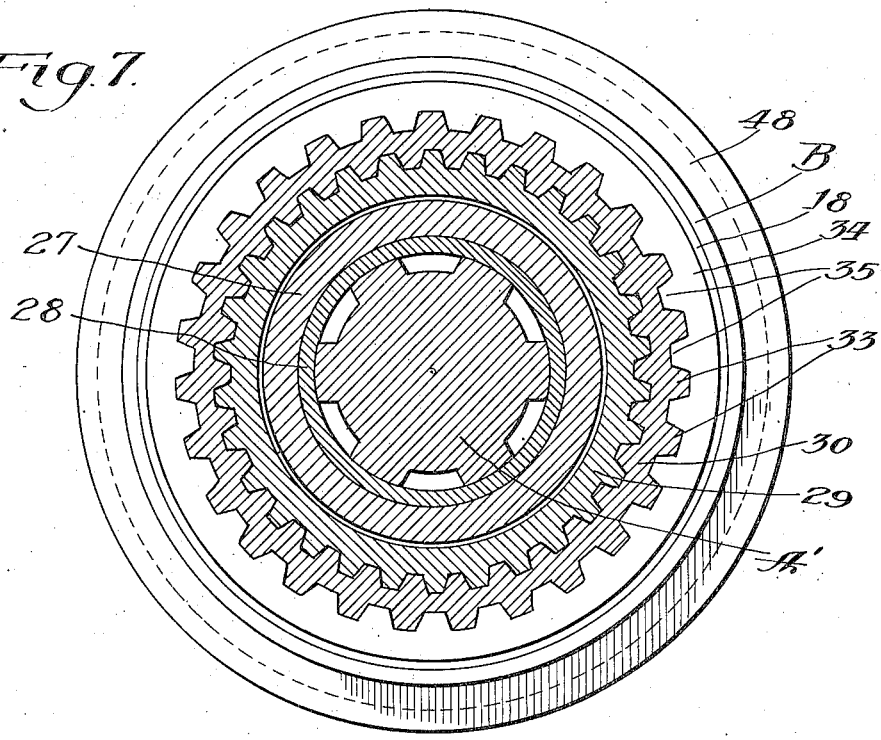
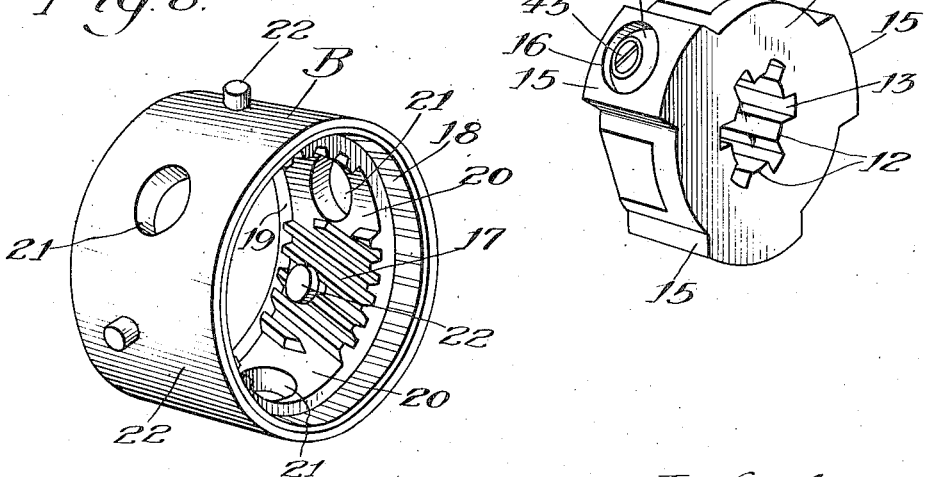

Inventor
Bruce Ridgeway

Patented Mar. 15, 1938

2,110,964

UNITED STATES PATENT OFFICE 2,110,964

TRANSMISSION

Bruce Ridgeway, Mexico, Mo., assignor to Ridgeway Automatic Transmission Co.

Application October 1, 1936, Serial No. 103,593

8 Claims. (Cl. 74—337)

This invention relates to transmissions for automobiles and the like and more particularly to automatic transmissions, but the invention may also be used in connection with an automatic clutch or in other connections.

An object of the invention is to provide an improved transmission in which gears are shifted automatically upon a change in the direction of the applied torque.

A further object is to provide a transmission in which the automatic shifting of gears is controlled both by the direction of the applied torque and by the speed of revolution.

Another object is to provide a transmission in which the automatic shifting of gears is accomplished smoothly without unnecessary noise or undue strain on any of its parts.

Still another object is to provide a transmission of simple compact construction which may be easily adapted for use with equipment now standard in the trade.

Figure 1:
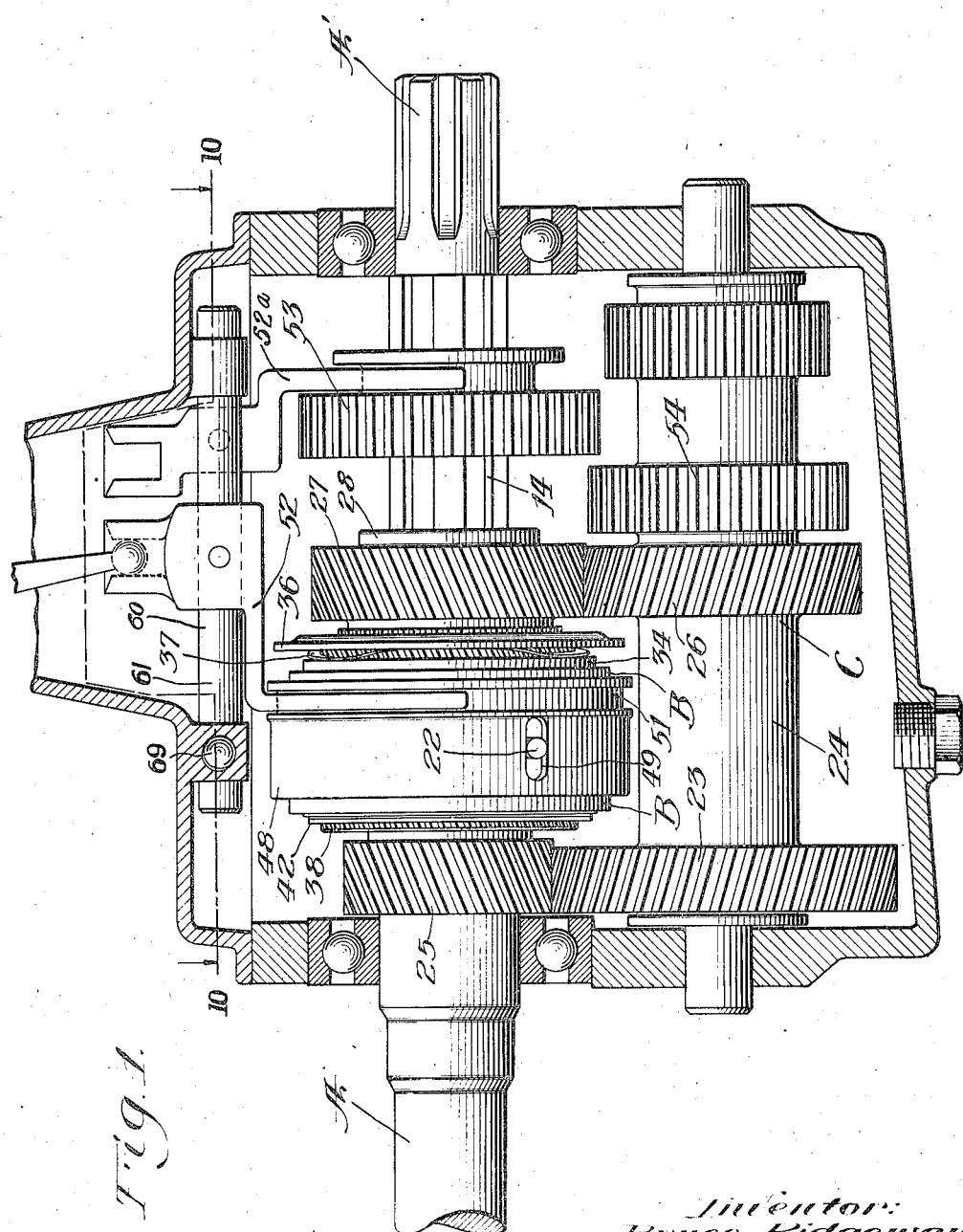
Figure 2:
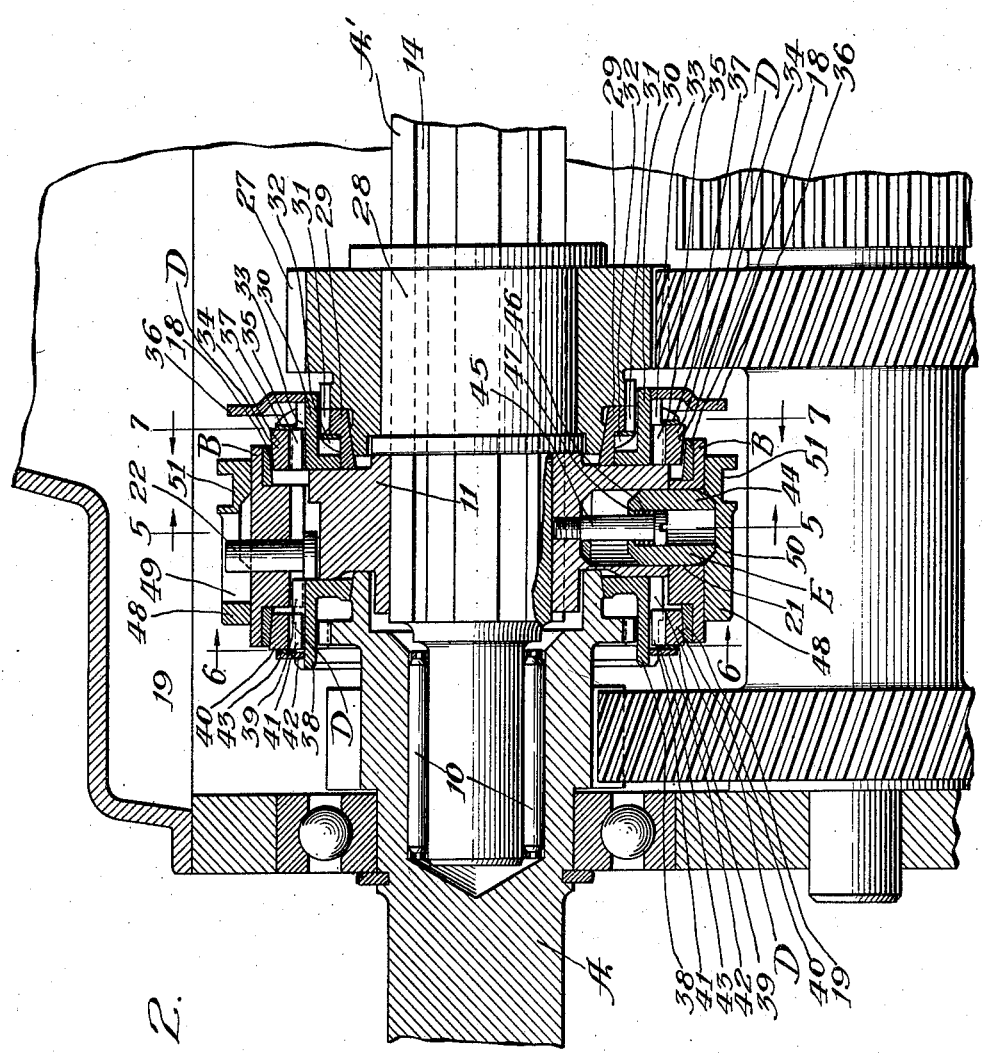
Figure 3:
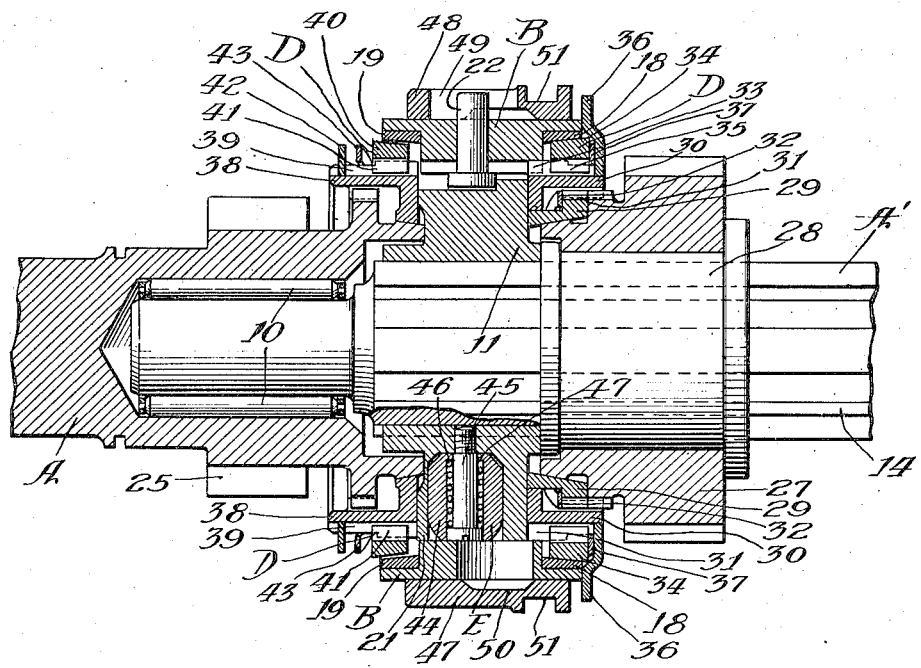
Figure 4:
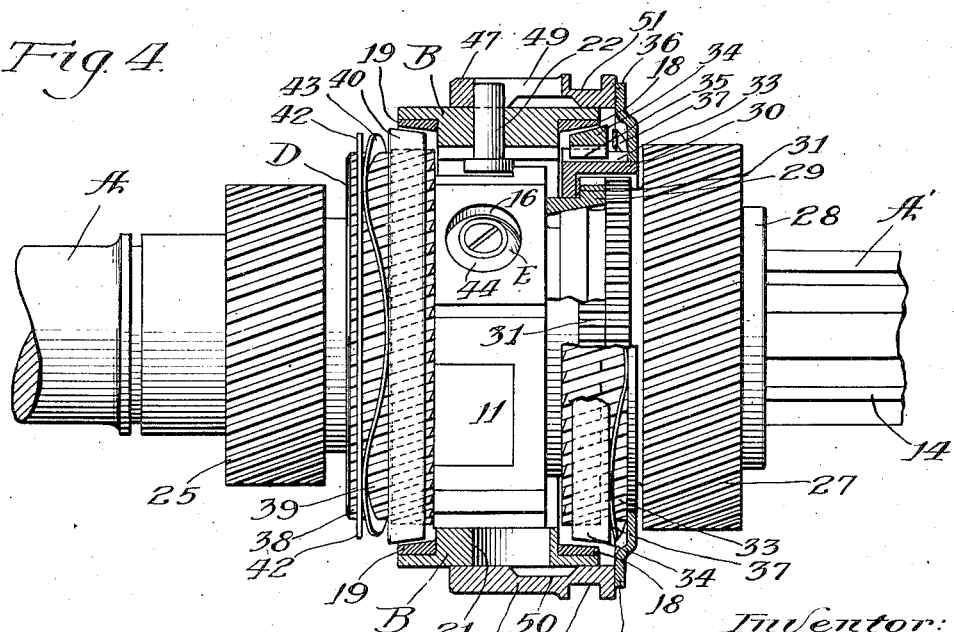
Figure 5:
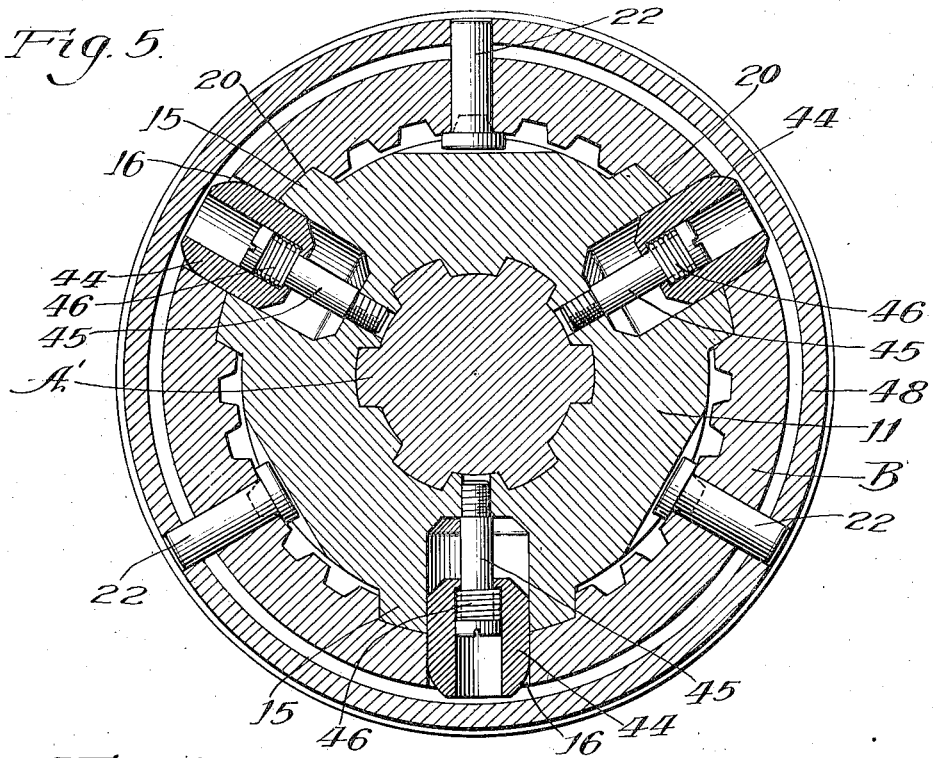
Figure 6:
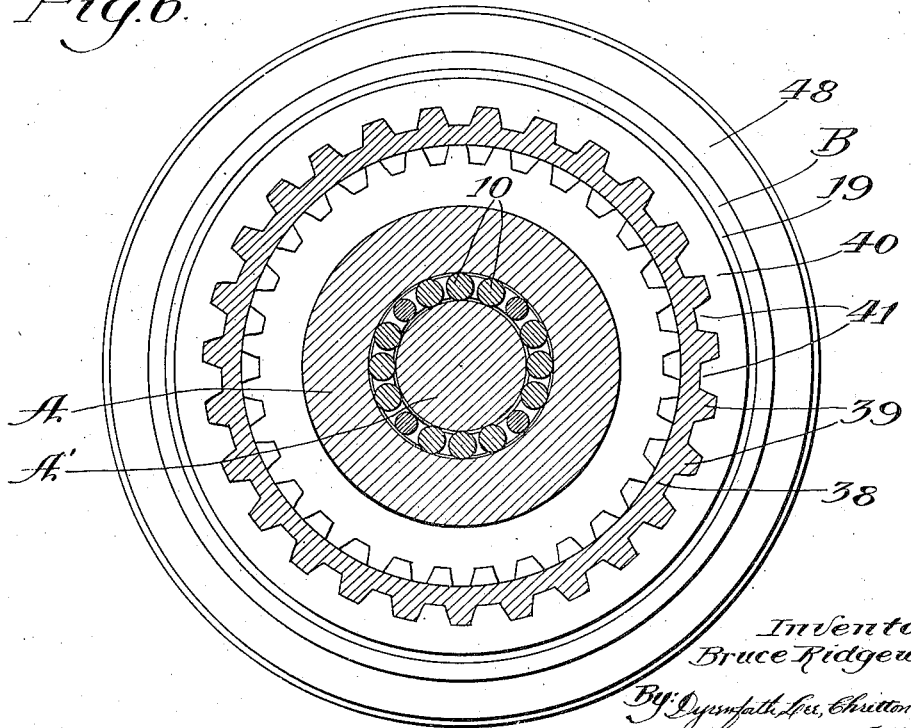
Figure 10:
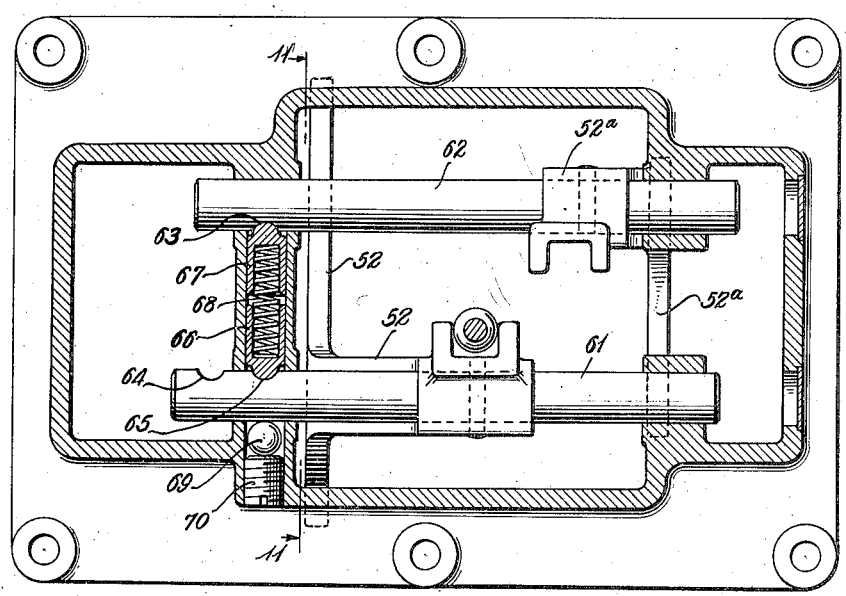
Figure 11:
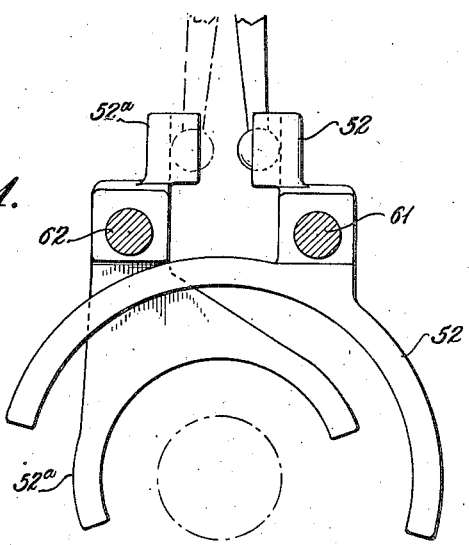

Other objects and advantages will appear as the specification proceeds. An embodiment of my invention is illustrated in the accompanying drawings in which:

Figure 1 is a view in side elevation of a transmission in a form common to the trade and including my improved structure, the casing being shown in section to expose the gearing;

Fig. 2, a side elevational view showing my improved mechanism enlarged and in cross section, the parts being shown in position for direct or unitary connection between the shafts;

Fig. 3, a view of the improved mechanism similar to the showing in Fig. 2, but with the parts in position for drive through the idling gear and gear train;

Fig. 4, a broken sectional view showing the parts in neutral position, the shafts being unconnected through the shifting member;

Fig. 5, a sectional view through the shifting member, the view being taken as indicated at line 5—5 of Fig. 2;

Fig. 6, a sectional view taken as indicated at line 6—6 of Fig. 2;

Fig. 7, a sectional view taken as indicated at line 7—7 of Fig. 2;

Fig. 8, a view in perspective of the shifting member;

Fig. 9, a perspective view of the drive hub;

Fig. 10, a plan sectional view, the section being taken as indicated at line 10 of Fig. 1; and Fig. 11, a transverse sectional view, the section being taken as indicated at line 11 of Fig. 10.

As illustrated, A and A' designate drive and driven shafts respectively; B, a shifting member; C, a drive train and idling gear; D, clutch means for connecting the shifting member with either shaft A or the idling gear; and E, speed responsive control mechanism.

Shafts A and A' may be of any ordinary construction, and may be of the exact form of those now used in transmissions of common construction. The drive shaft A, which receives torque from the engine or power source, receives the end of the driven shaft A' within an end recess. The shafts are aligned and free to rotate with respect to each other, the end of shaft A' being held within roller bearing 10.

The shifting member B is mounted on shaft A' by means of a drive hub 11. These parts are shown more particularly in Figs. 8 and 9. The hub 11 is adapted to be firmly secured to shaft A'. In the present embodiment splines 12 at the shaft opening 13 are provided for engaging longitudinal grooves 14 in shaft A', but other means may be used for securing hub 11 to the driven shaft if desired. On its outside, hub 11 is provided with three radial projections 15, each of which contains a radial bore 16. The metal on hub 11 between projections 15 is cut away to allow room for splines on the shifting member.

The shifting member B comprises a cylindrical shell having on its inside surface the spiral splines 17. At each end of member B the spiral splines 17 are cut away and the inside diameter increased to provide tight sockets for the friction rings 18 and 19 which have internal surfaces of conical form. At three places splines 17 are cut away to provide slots 20 into which the projections 15 will fit. In the center of slots 20 are the apertures 21 having the same diameter as bores 16 in hub 11. The pins 22 project radially from member B at points between the apertures 21.

The gear train and idling gear C may be of any well known or common construction. As here shown, the gear 23 on shaft 24 is in engagement with gear 25 on shaft A, and gear 26 also on shaft 24 is in engagement with the idling gear 27 which is mounted on shaft A' by the use of a suitable bearing 28.

The clutch means D includes mechanism for making engagement between the shifting member B and the idling gear 27, and also mechanism for making engagement between the shifting member B and the shaft A.

Mechanism for connecting idling gear 27 includes an adapter ring 29 which is used here only for the purpose of adapting a standard form of idling gear to receive the connecting mechanism.

Adapter ring 29 is firmly secured about the forward end portion of idling gear 27 and provides a suitable structure to which the clutch means, later to be described, may be attached. It is necessary in this embodiment only because the standard make of idling gear 27 does not provide a suitable supporting structure. Where my improved mechanism is not to be adapted to standard transmission gears already made, gear 27 and ring 29 would be formed integral and they may be so considered for the purpose of this description.

Resting on ring 29 and in toothed engagement with idling gear 27 and ring 29 is drive ring 30 which, being mounted by means of the straight teeth 31, is free to move axially of the idling gear, but is held against rotation with respect to it. In the present embodiment the straight teeth 31 on the interior of ring 30 engage with complementary teeth on ring 29 and gear 27, and by such engagement the ring 30 is carried in fixed rotational relation but in movable axial relation with gear 27. A spring 32 between rings 29 and 30 urges ring 30 forwardly. The outer periphery of ring 30 is provided with teeth or splines 33 which are diagonally arranged and preferably in spiral form. Any instrumentality having an angular lead may be employed. The relation between teeth 33 and splines 17 of member B is such that teeth 33 will turn into engagement with splines 17 when turned counter-clockwise as a left-hand screw.

Mounted on the outer periphery of ring 30 is the synchronizing cone 34 which is provided internally with spiral splines 35, or other instrumentality having an angular lead, which engage with teeth 33 of ring 30. This cone has an outer surface of such shape as to correspond with the friction ring 18 and is adapted to enter ring 18 and yield greater friction at closer engagement.

The shift plate 36 is secured to drive ring 30 and extends upwardly from this ring behind cone 34. Between plate 36 and cone 34 is a spring 37 which urges cone 34 forwardly from the drive ring 30.

The mechanism for connecting the shifting member B with shaft A is similar in many respects to the mechanism just described. It includes the drive ring 38 which, as here shown, is mounted on and in toothed engagement with shaft A. However, this ring is made separate from shaft A only for the purpose of adapting the improved mechanism to shafts of common form and make, and might, so far as the operation of my device is concerned, be made integral with shaft A. On its outer periphery ring 38 is provided with teeth or splines 39 which are diagonally arranged and preferably in spiral form. The relation between teeth 39 and splines 17 of member B is such that teeth 39 will turn into engagement with splines 17 when turned clockwise as a right-hand screw.

Mounted on the outer periphery of ring 38 is a second synchronizing cone 40 which is provided internally with spiral splines 41 which engage teeth 39 of ring 38. This cone has an outer surface of such size and shape as to correspond with the friction ring 19 and is adapted to enter this ring and yield greater friction at closer engagement. Instead of spiral splines or teeth 39 and 41, any suitable instrumentality or device having an angular lead may be employed.

A retainer washer 42 is attached to drive ring 38 and extends outwardly in front of cone 40. Between cone 40 and washer 42 is a spring 43 adapted to urge the cone 40 rearwardly to shaft A.

The speed responsive control mechanism E comprises hollow weights 44 slidably mounted in bores 16 by means of bolts 45 screwed into hub 11 at the bottom of bore 16. Coil springs 46 extending between the heads of bolts 45 and shoulders 47 of the weights tend to retain weights 44 inwardly of hub 11.

To provide a means for coordinating my improved mechanism with conventional gear shifting means, I have provided a collar 48 which comprises a cylindrical shell adapted to fit over the shifting member B; slots 49 are provided in its wall for receiving pins 22, and a groove 50 in its inside surface may receive the outer portion of weights 44 when the parts are in direct drive position. The exterior annular slot 51 in the wall of collar 48 is provided for receiving fork 52 shown in Fig. 1. Fork 52 is fixedly connected to the longitudinal slidable bar 61. A second fork 52ª engages the axially slidable gear 53 and is fixedly connected to a second slidable bar mounted parallel with and at one side of bar 61. The lower portion of the operator's shifting lever extends between these two parallel bars and may actuate either of them as to forward and backward movement. A locking pin (not shown) is slidably mounted between the parallel bars and adapted to move transversely into engagement with notches in the sides of the bars for locking the bars against longitudinal movement upon such engagement.

The operator's shifting lever is so arranged that upon movement from high speed position to neutral position, the lower end of the lever makes engagement to move fork 52 and collar 48 to rearward position. Then upon movement of the shifting lever to low speed or reverse positions, the locking pin above referred to is caused to disengage from a notch in the side of the right-hand bar and move into engagement with a notch in the left-hand bar 61 to lock bar 61 and fork 52 in rearward position until the lever is again moved to neutral position. The construction of forks 52 and 52ª and the means by which they are actuated through operation of the shifting lever are well known to the trade and are typical of such constructions now in use.

When moved rearwardly to its extreme position, collar 48 impinges the shift plate 36 and by this means pulls drive ring 30 rearwardly and safely out of engagement with the shifting member B. The slots 49 in collar 48 receive pins 22 and allow the shifting member B to move axially independently of the collar but at the same time prevent rotational movement independent of the collar.

Referring more specifically to the gear shift mechanism shown in Figs. 1, 10 and 11, the shift fork 52 is fixed to shaft 61 mounted for axial movement in the casing and the fork member 52ª is fixed to shaft 62 mounted for axial movement in the casing. The shaft 62 is provided with a locking indentation 63 and the shaft 61 is provided with locking indentations 64 and 65. Between the members 61 and 62 are a pair of slidably mounted locking pins 66 and 67, the pins being urged apart by spring 68. The ball member 69 is urged by an adjustment screw 70 against shaft 61 to aid in maintaining it firmly in either of the stop positions.

In the gear shift illustrated in Figs. 1, 10 and 11, the fork 52ª is in neutral position while the fork 52 is in operative position permitting the shifting member to connect either with the drive shaft or with the idling gear. When it is desired to move the fork 52 to neutral position in which the shifting member cannot engage either the idling gear or drive shaft connections, the shift lever is operated so as to move fork 52 to a rear position exactly opposite the recess of the member 52ª. In this position the lower end of the shift lever can be moved to the recess of the member 52ª and employed to shift the fork 52ª to bring the gear 53 into engagement with low gear 54. Vice versa, when it is desired to shift from low gear, the member 52ª must be moved to the neutral position shown in Figures 1 and 10, in which position the recess thereof is opposite the recess of fork 52. The operator may then shift the lower ball end of the shift lever into the recess of fork 52 and move it to the position shown in Fig. 1 to render the shifting member B operative for engagement with the idling gear or with the connections on the drive shaft.

Operation

Assuming that an automobile equipped with my improved transmission is to be started from a standstill and accelerated to high speed, the operation is as follows:

When the motor is started, torque is applied to shaft A, and this shaft begins to rotate. Then by releasing the clutch, the operator may shift to first gear by moving his shifting lever to bring gear 53, see Fig. 1, into engagement with gear 54 on shaft 24. When this shift is made, the drive is from gear 25 on shaft A through gears 23 and 54 on shaft 24 and gear 53, to shaft A'. Engagement of the clutch then applies the power of the engine to the wheels of the automobile and it starts moving. During this operation, the collar 48 is held rearwardly in its extreme position by fork 52, in the manner above described, so that the drive ring 30 is held safely out of engagement with shifting member B, the spring 32 being compressed and spring 37 drawn rearwardly so that cone 34 makes no contact with friction ring 18. Neither can drive ring 38 make contact with the shifting member, the shifting member being held out of contact by pins 22 impinged against the end of slots 49. Thus in this position the shifting member B is entirely inoperative and under no load, the drive being carried from shaft to shaft by other means.

When the automobile has attained sufficient speed and it is desired to shift to second gear, the operator may release his clutch and move his shifting lever to disengage gears 53 and 54, after which he may immediately engage his clutch. This movement of the shifting lever operates to move the bar connected to fork 52ª in a rearward direction, bringing a notch in this bar into alignment with the locking pin previously referred to so as to allow the locking pin to move out of locking engagement with bar 61 to which the fork 52 is attached. With fork 52 and collar 48 free to move forwardly, the spring 32 expands, moving ring 30 forwardly but not yet into contact with the shifting member, and moving the spring pressed cone 34 forwardly into engagement with friction ring 18 in the shifting member. Friction between ring 18 and cone 34 tends to cause these parts to rotate at the same speed. At this instant, the cone 34 being rotatably connected with the drive shaft, is rotating at greater speed than is the ring 18 which is rotatably connected with the driven shaft. The tendency, then, is to rotate cone 34 with respect to the ring 30, which rotation is possible to a limited extent because of the diagonal or spiral tooth connection between these parts.

The torque impressed on cone 34 relative to ring 30 serves to thrust the ring 30 rearwardly and out of engagement with the shifting member. As the driver allows the speed of the motor to decrease, rotation of drive ring 30 and cone 34 is retarded and quickly reaches the point where the shifting member and cone 34 are rotating at the same speed. At this point, the torque driving the shifting member is equal in amount to the torque of the idling gear 27 as applied to cone 34, and relative torque between the two members disappears. An instance later when the cone 34 begins to run slightly slower than the shifting member, relative torque between these members again appears but in opposite direction. The point of synchronous speed then is detected by the absence of relative torque. In the absence of relative torque, ring 30 will not be urged rearwardly by its diagonal tooth connection with cone 34, and it will be pressed forwardly by spring 37, and as it moves forwardly it will rotate with respect to cone 34 in the manner of a left-hand screw. This forward movement is aided by relative torque tending to retard rotation of cone 34, as such torque appears after the parts pass through synchronous speed. The above movement puts ring 30 forward and in position for engagement with splines 17 of the shifting member.

Here it should be noticed that there is no possibility of the ring 30 engaging splines 17 until synchronous speed of these parts is reached, even though the function of cone 34 were omitted, for until synchronous speed is reached relative rotation of these members is in the wrong direction to allow engagement with the spiral splines.

With continuous relative torque in the reverse direction, ring 30 continues its forward movement and engages splines 17 of the shifting member, pulling the shifting member rearwardly into drive relation with shaft A. (The shifting member, being slidably mounted on hub 11, is free to move axially.) This drive connection remains as long as the relative torque between the shifting member and ring 30 remains in this direction. However, when the driver of the automobile shuts off power applied to the drive shaft, relative torque between member B and ring 30 again reverses and disengagement takes place in teeth 33 sliding backward in the spiral splines 17 to break the connection. This backward movement of ring 30 is aided by the relative torque tending to accelerate cone 34. The operation, as thus far described, takes place as drive connection for second gear is made and again disconnected.

Going back now in the events described to the point where relative torque is causing engagement between the idling gear and the shifting member, at this instant there could be no possibility of engagement of drive ring 38 with the shifting member, since if cone 40 should ever come into contact with the shifting member, the shifting member would immediately be thrust rearwardly, due to the inclined engagement between the cone 40 with the drive ring 38. Thus there is no possibility of engagement between drive ring 38 and the shifting member at the time the relative torque is in a direction to bring about engagement between drive ring 30 and the shifting member. It will be seen that any engagement between cone 40 and the shifting member would be only momentary when the torque is in such direction, for the thrust effective for moving the shifting member rearwardly would also serve to remove the shifting member from engagement with the cone. But when the relative torque is again reversed to disconnect the shifting member from the idling gear as previously described, then the relative torque between the shifting member and cone 40 operates to rotate cone 40 in a direction such that drive ring 38 and the shifting member B are drawn together. As this continues, the shifting member slides forwardly, and teeth 39 of drive ring 38 come into engagement with splines 17 of the shifting member to complete the direct drive connection, the shafts A and A' now being connected for rotation in unison.

Without any provision for locking the parts in direct drive condition, this drive connection would be broken as soon as power is turned on and the relative torque between shaft A and shifting member B is reversed. To prevent this I provide the speed responsive control mechanism E.

Upon rotation of shaft A' the weights 44 in hub 11 are urged outwardly against the tension of springs 46 by centrifugal force. When the parts come into position for direct drive, as above described, and shaft A' is rotating above some predetermined speed, weights 44 are moved outwardly through apertures 21 in the shifting member and in the groove 50 of collar 48, thus locking the parts in this drive connection.

Once the locked high gear drive is accomplished, this connection will ordinarily be retained until power is removed from shaft A, the end thrust exerted upon shifting member B tending to bind the weights 44 at the junction between the shifting member and the projections 15 on hub 11 to hold these weights upwardly in locking position, even though rotation is decreased below the predetermined speed at which centrifugal force no longer overcomes tension in springs 46. Ordinarily, then, release of the high gear drive requires the concurrence of absence of power supplied to shaft A and rotation of shaft A' below the predetermined speed.

But in certain instances it is desirable to shift to second gear, though the driven shaft is rotating above the predetermined speed. To do so, the operator of the automobile may, as he ordinarily does in the case of ordinary transmissions, move his shifting lever quickly into position for second gear; this operates, just as in any common arrangement, to shift fork 52. Shifting of fork 52 causes collar 48 to move endwise, and the edge of groove 50 engages the rounded ends of weights 44 to drive them inwardly. Once the weights have passed inwardly far enough to clear the shifting member, relative torque between the shifting member and the parts it engages operates to shift the drive to second gear.

The above operation takes place very quickly and each of the shifts as above described requires only a short period of time.

While I have described a specific construction which is particularly well adapted for use just as described above, it will be seen that my invention may also be useful in other connections. For example, the automatic shift of gears may be from first to second speeds, or from high gear to a still higher gear.

The foregoing detailed description has been given for clearness of understanding only, and no unnecessary limitations should be understood therefrom, but the appended claims should be construed as broadly as permissible, in view of the prior art.

I claim:

1. A transmission comprising a pair of aligned shafts, an idling gear on one of said shafts, a shifting member rotatably secured on said one shaft and slidable along the axis of said shafts, said shifting member being equipped with spiral splines, means carried by said idling gear and in fixed rotational relation therewith for engaging said spiral splines to bring said shifting member and idling gear into positive drive connection when relative torque between said shafts is in one direction and for separating said shifting member and idling gear to break said connection when said relative torque is reversed in direction, and means associated with the other of said shafts for engaging said spiral splines after said drive connection has been broken and while said torque is in said reversed direction to connect said member and said other shaft in drive relation.

2. A transmission comprising a pair of shafts, a gear train associated with one of said shafts, a shifting member associated with the other of said shafts, means for connecting said shifting member and said gear train, said connecting means being adapted to be urged into connecting engagement by relative torque between said shafts in one direction, the engagement between said connecting means and said shifting member being such that engagement contact is maintained only by relative torque between said shafts in said direction, and speed responsive means for locking said connecting means and said shifting member in engagement when said shifting member is rotating above a predetermined speed.

3. In apparatus of the character set forth including a pair of shafts: a shifting member associated with one of said shafts; and means for connecting said other shaft with said shifting member, said means comprising a friction ring adapted to slidably engage said shifting member, and a drive ring in fixed rotational relation with said other shaft, said friction ring being so arranged as to urge said drive ring and shifting member axially into engagement to bring said shafts into drive relation when said shifting member is rotating in one direction with respect to said friction ring and out of engagement to destroy said drive relation when said shifting member is rotating in another direction with respect to said friction ring; and a second means for connecting said other shaft with said shifting member, said second means being adapted to connect said shafts in a different gear ratio from said first mentioned means.

4. In apparatus of the character set forth including a pair of shafts: a shifting member associated with one of said shafts; and means for connecting said other shaft with said shifting member, said means comprising a friction ring adapted to slidably engage said shifting member, and a drive ring in fixed rotational relation with said other shaft, said friction ring being so arranged as to urge said drive ring and shifting member axially into engagement to bring said shafts into drive relation when said shifting member is rotating in one direction with respect to said friction ring and out of engagement to destroy said relation when said shifting member is rotating in another direction with respect to said friction ring; and a second means for connecting said other shaft with said shifting member, said second means including a friction ring, said ring of the second means being so arranged as to produce drive connection between said member and said other shaft when said shifting member is rotating in one direction with respect to it and to destroy said drive connection when said shifting member is rotating in a direction opposite said one direction.

5. Apparatus as set forth in claim 4 and including means for holding said drive ring in an extreme rearward position, said means being adapted also to render said second means ineffective to connect said other shaft and said shifting member in drive relation while said drive ring is so held in its extreme rearward position.

6. A transmission comprising aligned driving and driven shafts, a gear train connected to the driving shaft and adapted to be connected to the driven shaft, a shifting member slidably mounted with respect to the driven shaft and axially movable with respect thereto, means for connecting said shifting member and said gear train when the speeds thereof become synchronized, and means for blocking such connection when said member rotates faster than the gear train, said last-mentioned means including a connection carried by said gear train and provided with an instrumentality having an angular lead, a cone ring adapted to frictionally engage said member and provided with a device complemental to said instrumentality and adapted to cooperate therewith.

7. A transmission comprising aligned driving and driven shafts, a gear train connected to the driving shaft and adapted to be connected to the driven shaft, a shifting member slidably mounted with respect to the driven shaft and axially movable with respect thereto, means for connecting and disconnecting said shifting member and gear train, means for connecting said driving shaft directly to said shifting member, and means for blocking such last-mentioned connection when said driving shaft rotates faster than said shifting member, said blocking means including an instrumentality having an angular lead carried by said driving shaft, and a cone-ring adapted to frictionally engage said shifting member, said friction ring being provided with a device complemental to said instrumentality and adapted to cooperate therewith.

8. A transmission comprising aligned driving and driven shafts, a gear train connected to the driving shaft and adapted to be connected to the driven shaft, a shifting member slidably mounted with respect to the driven shaft and axially movable with respect thereto, torque responsive means for connecting said shifting member to said gear train when the torque is in one direction, a second torque responsive means for connecting the shifting member to the driving shaft when the torque is reversed, means frictionally engaging said member and preventing said last-mentioned connection when said driving shaft rotates faster than said shifting member, and speed-responsive means for locking said shifting member to said driving shaft after said last-mentioned connection is made.

BRUCE RIDGEWAY.